Nov. 12, 1968  K. H. RECKER  3,410,068
FRUIT PICKER
Filed July 16, 1965  2 Sheets-Sheet 1
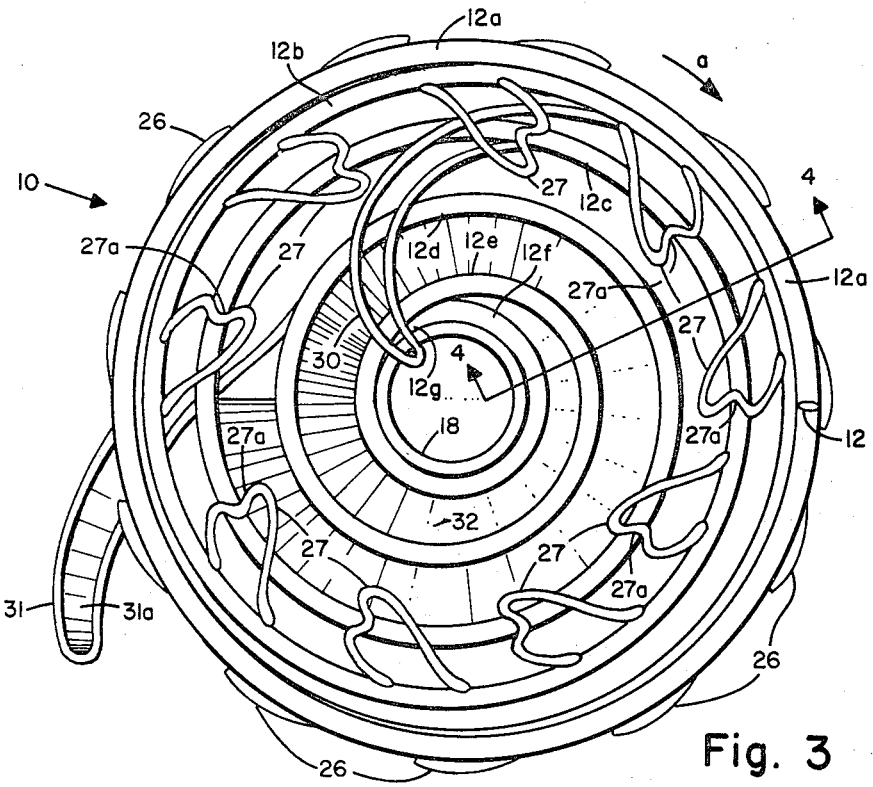
Fig. 3
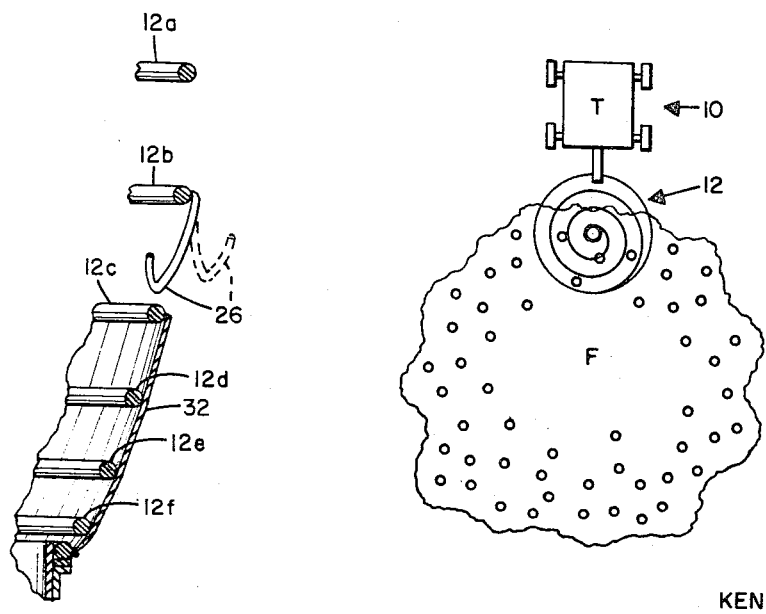
Fig. 4
Fig. 1
INVENTOR
KENNETH H. RECKER
BY
ATTORNEY

United States Patent Office 3,410,068
Patented Nov. 12, 1968

3,410,068
FRUIT PICKER
Kenneth H. Recker, Winter Haven, Fla., assignor to Heli-Pic., Inc., Polk County, Fla., a corporation of Florida
Filed July 16, 1965, Ser. No. 472,414
19 Claims. (Cl. 56—332)

ABSTRACT OF THE DISCLOSURE

A fruit picker is disclosed comprising a relatively rigid rod in the form of a helix which is supported on a vehicle with its axis upright, means being provided for rotating the helix about its axis and for moving the helix vertically so that the helix may be threaded through the outer edge portions of fruit trees. The maximum diameter of the helix at the open end portion is such as to permit fruit bearing end sections of tree branches to be contained inside the helix. The convolutions of the helix at the open end are spaced apart so that fruit bearing branches of trees are received therebetween as the helix is threaded through the outer end portions of tree branches. Fruit engaging members are attached to the convolutions of the helix, some of which are arranged to extend towards the next convolution and others to extend towards the central portion of the helix so as to engage the fruit on the tree branches extending between convolutions and strip the fruit from the branches as the helix rotates. The fruit stripped from the branches falls into the lower end of the helix and is transferred therefrom to a bin or the like. A branch engaging member projects outwardly from a side of the helix and urges branches extending into the helix to be deflected from the helix causing the fruit on these branches to be stipped by the fruit engaging members. The fruit engaging members are yieldable to permit tree branches to move between the convolutions. The helix has an open end of relatively large diameter and the diameter decreases towards the opposite end.

---

The present invention relates to an improved method and apparatus for picking fruit from the branches of trees or bushes.

A principal object of the invention is the provision of a method for picking fruit from the branches of a tree or bush in which the portions of a branch bearing fruit are positioned between two parallel elongated elements extending transversely of the branches, the elements being moved longitudinally of the branches so that the branches may slip from between the two elements, while the fruit on the branches is prevented from moving between the elements and are thereby removed from the branches as the elements move from the branches.

A further object of the invention is the provision of a method of picking fruit from the branches of a tree or the like comprising providing a relatively rigid elongated element in the form of a helix or spiral which is rotated about its axis and moved relative to a tree so as to cause the convolutions of the spiral to thread through branches at the outer edge of the tree with the ends of the branches including fruit thereon extending within the spiral and positioned between the convolutions, and preventing removal of fruit from inside the spiral while causing relative movement between the spiral form and branches to remove the branches from between the convolutions of the spiral while retaining the fruit therein which is then discharged into a collection bin or the like.

Another object of the invention is the provision of an improved apparatus for picking fruit from a tree or brush comprising means forming two substantially co-extensive relatively rigid elongated elements which are spaced apart so as to receive portions of fruit bearing branches therebetween, a plurality of yieldable elongated elements attached to at least one of said elongated elements and extending generally into the space between the elements to form a barrier to prevent the exit of fruit from between the elements while yielding to permit branches to slip therebetween, and means to move the elongated elements relative to the branches so as to receive portions of the tree branches therebetween and impart movement to fruit relative to the tree branches to separate the fruit from the tree.

A further object of the invention is the provision of a fruit picking apparatus comprising a rod-like relatively rigid element in the form of a helix or spiral, the convolutions of which are spaced apart to receive therebetween portions of branches bearing fruit, the helix being supported for rotation about its axis and movable along the axis as the helix is rotated so as to gather end portions of tree branches therebetween, the helix having fruit engaging means for separating fruit from the portions of the branches extended between the convolutions of the helix as the helix moves from the branches, the fruit then dropping downwardly inside the helix into a suitable container.

A still further object of the invention is the provision of an improved fruit picking apparatus of the type described in the preceding paragraph in which the fruit engaging means comprise yieldable wire-like members attached to one convolution and extending toward an adjacent convolution and which are in the form of a cam for urging branches engaged thereby toward the adjacent convolution so as to restrict the space between which the branches may be withdrawn from the helix whereby the fruit is retained within the helix while the branches slip from between the convolutions as the helix rotates.

Other objects and advantages of the invention will be apparent from the following description of a preferred form thereof, reference being made to the accompanying drawings wherein:

FIG. 1 is a more or less schematic overhead view of a fruit picking apparatus embodying the invention picking fruit from a tree;

FIG. 3 is a plan view of an element of the fruit picking apparatus; and

FIG. 4 is a sectional view taken substantially along line 4—4 of FIG. 3.

Figure 2:
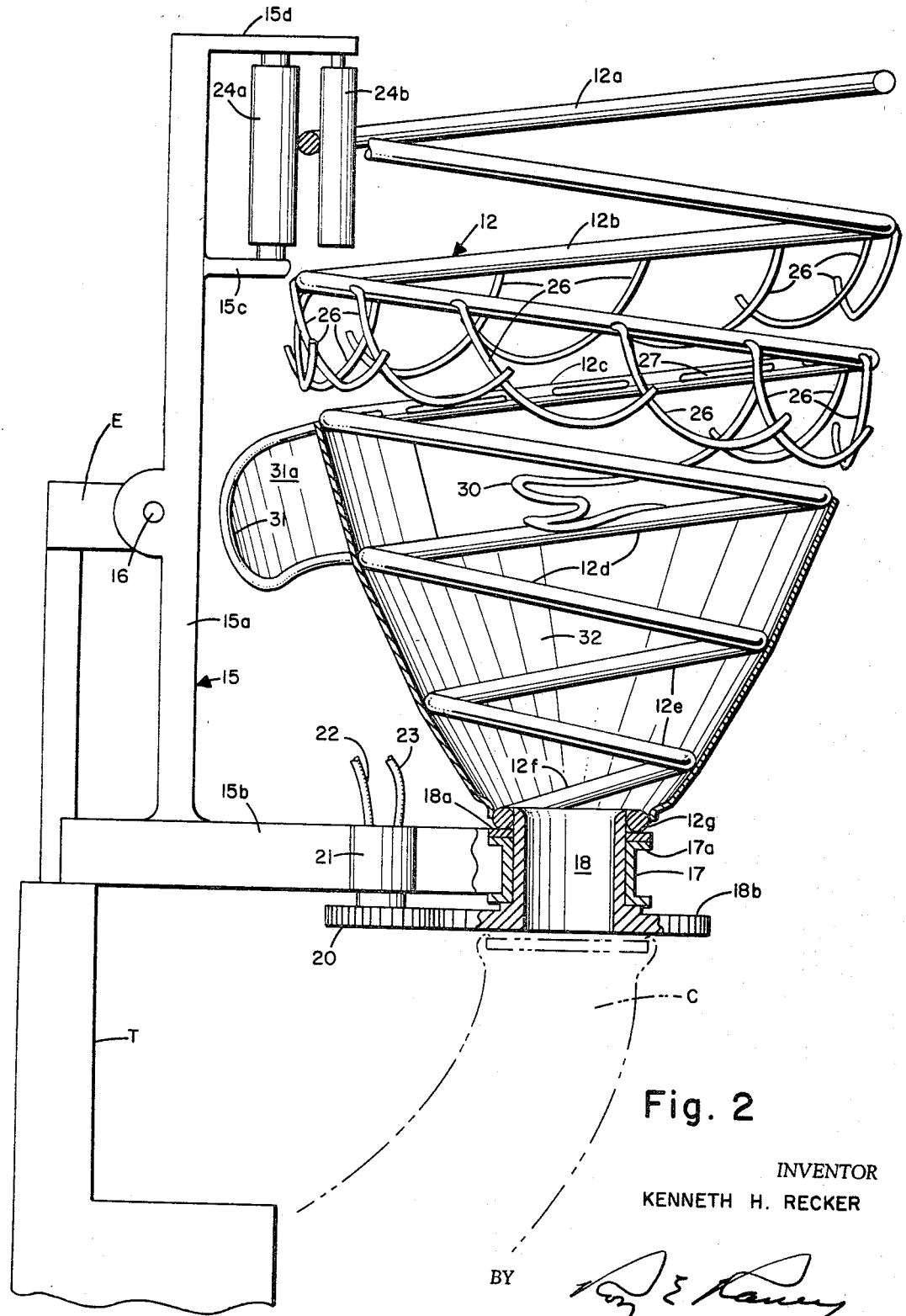
FIG. 2 is a fragmentary side elevational view of the fruit picking apparatus having certain parts broken away.

In the form of the invention shown, an orange picking apparatus 10 is carried on a suitable automative truck T which is capable of moving from tree to tree in an orchard to position the apparatus in operative relationship to the trees. Trucks suitable for this purpose are well known and therefore the details are not shown. The apparatus 10 comprises a suitable rigid rod-like element 12, such as aluminum rod in the form of a helix or spiral, having convolutions 12a, 12b, 12c, 12d, 12e, 12f. The lower and narrow end of the helix has a ring formation 12g. The first one and one half convolutions of the helix 12 are the same diameter and the remaining successively lower convolutions decrease in diameter and terminate in the ring 12g. Preferably, the diameter of the upper end of the helix is in the order of forty-eight inches although any suitable diameter could be selected. The space between the convolutions 12a, 12b and 12c is preferably in the order of eight inches, although this dimension would be varied to fit particular requirements, and the space between the convolutions 12c, 12d and 12e is preferably less than the diameter of the fruit to be picked.

The helix 12 is supported for rotary movement about its axis by drive mechanism described presently and it is also movable longitudinal of its axis by an elevator E on the truck T, which elevator carries a frame 15 having an upright part 15a and three laterally extending arms 15b, 15c, 15d. The frame 15 is attached at 16 to the elevator E so that the frame may be raised and lowered in a vertical direction. If desired, the elevator E may be tilted from vertical so as to move the frame 15 other than in a vertical direction. Trucks having elevators thereon like that mentioned are well known and therefore the details are not shown.

The helix 12 is supported on arm 15b by a bearing 17 which receives a sleeve 18 welded to the inside of ring 12g and which forms an outlet for fruit collected inside the helix, as is explained more fully hereinafter. A thrust flange 18a on sleeve 18 rides on a complementary 17a at the upper end of bearing 17 to support the helix for rotary movement about the axis of the helix.

The lower end of helix 12 is rotated by a gear 18b attached to the lower end of sleeve 18, and this gear is driven by a pinion 20 of a hydraulic motor 21 which is attached to arm 15b. Motor 21 is driven by hydraulic fluid fed to and from the motor through pipes 22 and 23 and control valves, not shown. Hydraulic motors of the type shown are well known and further description thereof is unnecessary to the understanding of the invention.

A suitable chute C is suspended beneath the lower end of sleeve 18 to direct the picked fruit into a suitable container, not shown.

The upper end of helix 12 is supported by two idler rollers 24a, 24b, the upper ends of which rollers are journaled in bearings in arm 15d, and the lower end of roller 24a is journaled in a bearing in arm 15c. The lower end of roller 24b is unsupported to permit passage of the convolutions 12a and 12b beyond that end of the roller. The rollers 24a, 24b firmly grip the convolution 12a and a portion of convolution 12b, and provide a support for the helix about an axis parallel to the upright part 15a of the frame 15.

It will be appreciated that with the apparatus thus far described, the truck T can be maneuvered so that the helix 12 is positioned beneath a tree, indicated a F, with about two-thirds of its diameter lying within the vertical plane of the outer ends of the tree branches, as seen in FIG. 1, and beneath the lower branches. By rotating the helix 12 by motor 21 in the direction indicated by the arrow a, FIG. 3, the leading end 12h of the spiral rod 12 is threaded into the tree branches and at the same time elevating the helix by the elevator E, the rod forming the helix will move into and through the end portions of the branches and cause the branches to be gathered into the central portion of the helix and to be worked toward the constricted end of the helix by the moving and spiraling convolutions until the branches are finally passed from the helix convolutions as the helix is rotated and elevated as is described more fully hereinafter.

Means are provided on the convolutions of the helix to engage fruit on the branches gathered inside the helix so as to pull the fruit from the branches as successive portions of the helix rotate beyond the ends of the branches. The fruit thereby separated from the branches is retained inside the helix and moves by gravity through the outlet sleeve 18 and into a container, as mentioned previously.

The fruit engaging means comprises a series of wirelike element 26 referred to herein as "gates," each of which is attached at one end to the outside of convolution 12b and each having a curve form which slopes in a direction opposite to the direction of rotation of the helix 12 and towards the next lower convolution 12c. The free ends of the gates 26 curve upwardly and across the following gate on the outer side thereof, so that each gate is free to flex outwardly and permit tree branches to slip tangentially from the helix. The gates 26 are of sufficient rigidity to cooperate with the convolution 12c, engage and prevent fruit from leaving the interior of the helix as the gates are carried by the rotating helix beyond the ends of the branches, and yet the gates may flex upwardly and outwardly to permit the branches and leaves thereon to slip between the convolutions as these portions of the helix rotate or move beyond the ends of the branches.

Additional fruit engaging elements 27 are attached to convolution 12c and comprise wires in the form of a W with the apex 27a thereof arranged to receive stems of fruit and the fruit to thereby separate it from its branch as the helix rotates. The elements 27 are positioned so that the reverse curve thereof faces in the direction of rotation of the helix.

Still another fruit engaging element 30 is provided which comprises a relatively rigid wire attached at its ends to convolutions 12c, 12d and having its free end curved inwardly and opposite to the direction of rotation of the helix so as to engage fruit on the tree branches inside the helix and sweep it inwardly of the helix and separate it from the branches. Cooperating with element 30 is a kicker 31 formed of a heavy wire partially closed by sheet metal 31a to provide a paddle-like member the ends of the wire forming the member being attached to the outer sides of convolutions 12c and 12d. The kicker member 31 slopes outwardly of the helix and the free end extends in a direction opposite to that of the rotation of the helix. Member 31 is positioned on the helix to engage tree branches which extend into the helix between convolutions 12c, 12d and force them to be withdrawn from between their convolutions at the time element 30 has engaged any fruit on the branches so that as the branches are forced from the helix by the member 31 the element 30 strips the fruit therefrom.

Fruit separated from the branches by the elements 26, 27 and 30 falls into the helix and is funneled into the sleeve 18 by a sheet metal wall 32 secured to the outer sides of the lower half of convolution 12d and convolutions 12e and 12f and ring 12g.

By moving the apparatus 10 about the perimeter of a tree, all of the fruit in the vicinity of the ends of the branches are quickly and effectively removed.

While I have described but one form of the invention it is to be understood that other forms, modifications and adaptations could be made all falling within the scope of the claims which follow.

I claim:

1. Apparatus for picking fruit from a tree or the like comprising a relatively rigid helical member the convolutions of which are spaced to receive portions of branches and the fruit thereon therebetween, a plurality of elongated yieldable members disposed between two convolutions for engaging fruit, and means to rotate said helix.

2. Apparatus for picking fruit from a tree or the like comprising a relatively rigid helical member the convolutions of which are spaced to receive portions of branches and the fruit thereon therebetween, a plurality of wire-like yieldable members attached at one end to one convolution and sloping toward the other convolution, said wire-like members forming cam means for urging tree branches toward said other convolution, and means to rotate said helix.

3. Apparatus for picking fruit comprising a helix formed of a relatively rigid member the convolutions of which are spaced apart to receive a portion of fruit bearing branches, means carried by said helix for engaging portions of fruit extended between said convolutions and to move the fruit relative to the branch supported thereby to separate the fruit from its branch, and means to rotate said helix about its axis and to translatably move said helix relative to said branches.

4. Apparatus for picking fruit comprising a helix formed of a relatively rigid member, the convolutions of which are spaced apart to receive a portion of fruit bearing tree branches therebetween, means to rotate said helix about its axis, and means forming a cam projecting from said helix for engaging and moving branches radially from said helix as said helix is rotated.

5. Apparatus for picking fruit comprising a helix formed of a relatively rigid member, the convolutions of which are spaced apart to receive a portion of fruit bearing tree branches therebetween, means to rotate said helix about its axis, means forming a cam projecting from said helix for engaging and moving branches radially from said helix as said helix is rotated, and means disposed on said convolutions for engaging fruit on the branches to separate said fruit from said branches as said helix is rotated about its axis.

6. Apparatus for picking fruit and the like comprising a helix formed of a relatively rigid rod like member having a relatively large open end and tapering toward a smaller opposite end, the first one and one-half convolution being of substantially equal diameters, means rotatably supporting said opposite end of said helix comprising an elevator structure having a support arm including a bearing, a sleeve attached to said opposite end of said helix and journaled in said bearing, power means for rotating said sleeve and helix in a given direction, means supporting said relatively large end of said helix comprising a pair of rollers disposed on opposite sides of said rod forming said one half said convolution, support structure supporting said rollers, one of said rollers being on the exterior of said helix and the other of said rollers being on the interior of said helix, said other roller being suspended by bearing means beyond the said relatively large end of said helix, a plurality of wire-like members each attached at one end to one of said convolutions and being curved to extend toward said opposite end of said helix and in a direction tangently to movement of said helix, means forming a projection extending outwardly from said helix and curved in a direction away from said direction of rotation of said helix, a member attached to said rod and curving inwardly of said helix, a circular wall forming a closure for the portion of said helix beyond said one and one-half, and power means for translating said helix vertically and horizontally.

7. Apparatus for picking fruit from a tree or the like comprising, means forming two substantially coextensive relatively rigid elongated elements comprising sections of a helix and spaced apart to receive portions of fruit bearing branches therebetween, means forming a yieldable barrier member attached to one of said elongated elements and having a shoulder surface extending into the space between said elements and generally longitudinally thereof to form a barrier to block the exit of fruit from between said elements, said member being yieldable laterally relative to one of said elements to permit branches to slip between said member and said one element, and means moving said elongated elements about the axis of said helix and relative to branches of a tree so as to receive portions of the branches therebetween and to move said elements longitudinally relative to said branches.

8. Apparatus as defined in claim 7 having a plurality of barrier elements each comprising a bar-like member supported at one end to one of said elongated elements and having a substantial portion thereof extending generally parallel to said elements.

9. Apparatus for picking fruit from a tree or the like as defined in claim 1 further characterized by means to support said helix with the axis thereof in a generally vertical position, and means to shift said helix vertically and to rotate said helix about its axis.

10. Apparatus for picking fruit from a tree or the like as set forth in claim 1 in which said helix includes an arcuate arm projecting inwardly from one side thereof and terminating adjacent the axis of said helix, and means to rotate said helix about its axis in a direction in which the inner end of said arcuate arm trails the outer end thereof.

11. Apparatus for picking fruit from a tree or the like as set forth in claim 2 further characterized by the last mentioned means rotating said helix about the axis thereof and in a direction in which said one end of said wirelike members lead said sloping portions thereof.

12. Apparatus for picking fruit from a tree or the like as set forth in claim 11 further characterized by an arcuate arm having a fixed end attached to one of said convolutions of said helical member and the other end terminating adjacent the axis of said helix.

13. Apparatus for picking fruit from a tree or the like as set forth in claim 12 further characterized by said arcuate arm comprising a wirelike member reversed at its central portion to form the end of said arm adjacent the axis of the helix and having said fixed end attached to one convolution of said helical member and the other end attached to a convolution immediately below said one convolution.

14. Apparatus for picking fruit from a tree or the like comprising a relatively rigid elongated element in the form of a helix, means for rotating said member about the axis of said helix, and fruit engaging means extending inwardly from said elongated member and presenting a wirelike shoulder extending inwardly of said helix in a plane transverse of the axis of said helix and facing in the direction of rotation of said helix, said shoulder adapted to engage fruit suspended from tree branches extending within the confines of said helix.

15. Apparatus for harvesting fruit from a tree or the like comprising, a rodlike member in the form of a helix, the convolutions of said helix adjacent one end being spaced apart to receive tree branches therebetween, frame means to support said helix for rotation about its axis relative to said frame and cause said helix to be threaded through branches of a tree by rotation of said helix about its axis, and means for translatably moving said helix in opposite directions along the axis of said helix and relative to said frame means.

16. Apparatus for harvesting fruit and the like as defined in claim 15 further characterized by said frame means comprising a vehicle adapted to be maneuvered along the ground.

17. Apparatus for harvesting fruit and the like as defined in claim 15 further characterized by power means to rotate said helix about its axis.

18. Apparatus for harvesting fruit and the like as defined in claim 15 further characterized by power means for moving said helix along its axis.

19. Apparatus for harvesting fruit and the like as defined in claim 15 further characterized by means on said frame for controlling rotation of said helix about its axis and translational movements of said helix along its axis.

References Cited

UNITED STATES PATENTS

| | | | |
|---|---|---|---|
| 296,644 | 4/1884 | Stone | 56—339 |
| 2,694,284 | 11/1954 | Kortz | 56—328 |
| 3,077,720 | 2/1963 | Grove et al. | 56—328 |
| 3,095,681 | 7/1963 | Sartorio | 56—339 |
| 3,222,855 | 12/1965 | Lasswell | 56—328 |

RUSSELL R. KINSEY, *Primary Examiner.*